Figure 1:
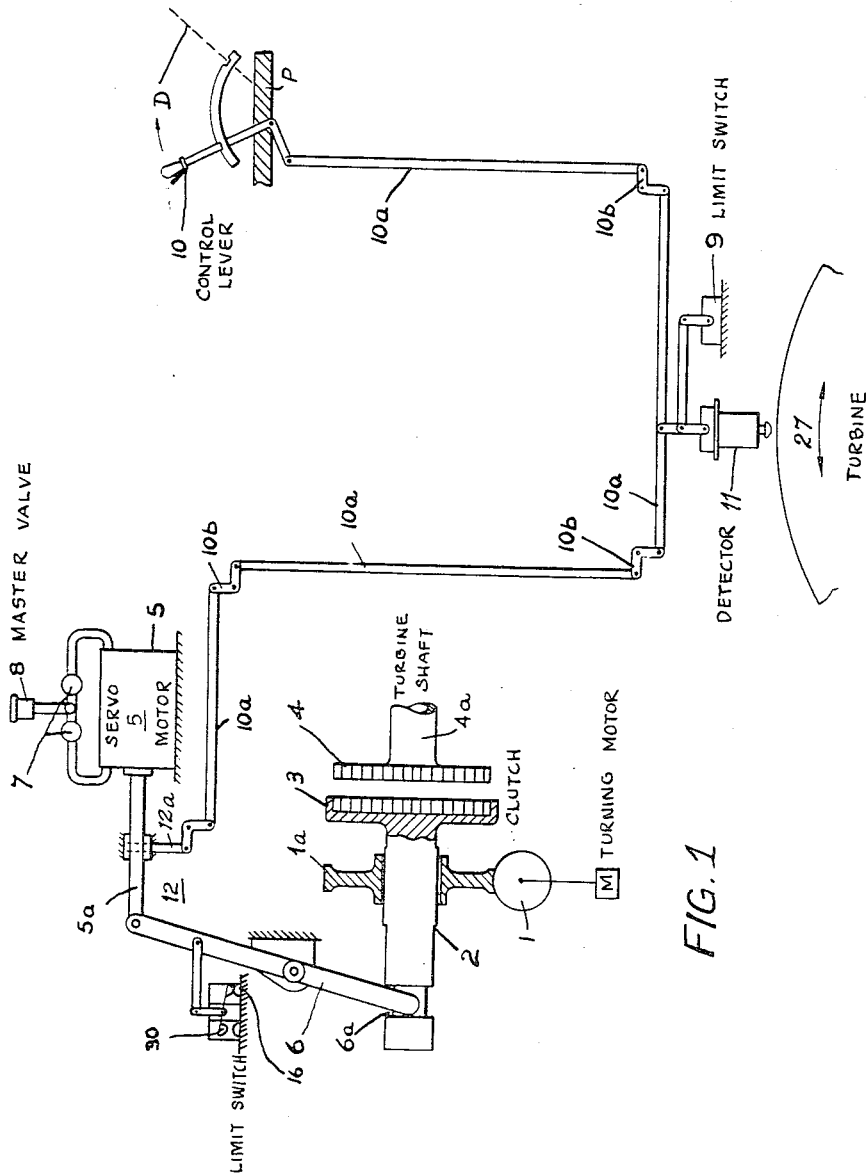

June 26, 1956

E. L. N. TOWLE 2,752,019

TURNING GEAR FOR STEAM TURBINE

Filed Aug. 27, 1953

2 Sheets-Sheet 1

INVENTOR
Edward Lewis Neville Towle

By Norris & Bateman

ATTORNEYS

United States Patent Office 2,752,019
Patented June 26, 1956

2,752,019
TURNING GEAR FOR STEAM TURBINE

Edward Louis Neville Towle, Stockport, England, assignor to Metropolitan-Vickers Electrical Company Limited, London, England, a company of Great Britain Application August 27, 1953, Serial No. 376,928

6 Claims. (Cl. 192—.02)

This invention relates to turning gear for a steam turbine, particularly but not exclusively for marine propulsion, and of the kind comprising a clutch of toothed or other positive abutment type for operatively connecting the turbine rotor with an electric turning-motor, a servomotor adapted to engage and disengage the clutch and a manually operable lever or like displaceable control member which can be moved into an "engaged" position for causing the servomotor to move the clutch in the engaging direction, or to a "disengaged" position for causing the servomotor to disengage the clutch.

The present invention provides, in turning gear of the kind referred to, means which facilitate engagement of the clutch. It is to be understood that the clutch is referred to herein as being engaged when the teeth or abutments of one clutch member have commenced entering the corresponding spaces in the other member.

According to the invention in turning gear of the kind referred to control means for the turning motor and the clutch servomotor comprise switching means responsive to movement of the control member to the "engaged" position to energise the turning motor under control of first time delay means operative to de-energise the motor a predetermined time delay after energisation thereof and to condition the servomotor for engaging the clutch, means responsive to relative movement of the clutch members into engagement with one another to reenergise the turning motor, further time delay means responsive jointly to said movement of the control member and to the clutch members remaining disengaged to condition the servomotor for return movement thereof, and means responsive to said return movement of the servomotor for energising the turning motor under control of said first time delay means, whereby upon de-energisation of the turning motor by said first time delay means the servomotor will again be conditioned to engage the clutch and the turning motor re-energised in response to engagement of the clutch.

The invention is, for example, applicable in turning gear of the kind forming the subject matter of copending U. S. patent application Serial No. 358,257, wherein the turning-motor drives the turbine through a reduction gear which may be of the worm or spur type. The final wheel of the reduction gear is provided with an internally splined hub through which slides a splined shaft which carries at one end a multi-toothed female clutch member. The shaft may be moved axially by the servomotor to cause the female clutch member to engage with a corresponding multi-toothed male clutch member mounted on the turbine shaft or on the pinion shaft of the reduction gear normally coupled directly to the turbine.

Figure 2:
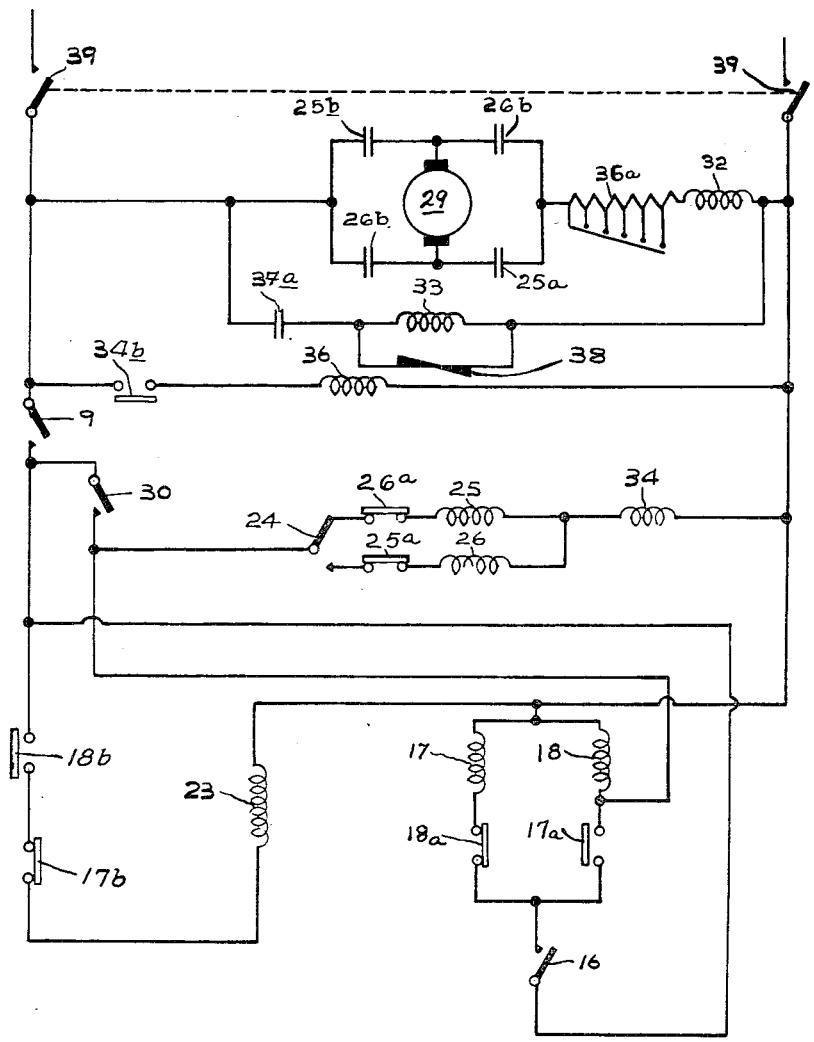

One preferred embodiment of the invention will now be described, by way of example only, with reference to the accompanying drawings, in which:

Fig. 1 is a diagrammatic representation of a turning gear of the character described in copending U. S. patent application Serial No. 358,257 aforesaid as modified according to the present invention, and Fig. 2 is a circuit diagram of the arrangement. In Fig. 2 relay contacts are shown in positions corresponding to the respective relays being de-energised.

In Fig. 1 the means for driving the turbine is an electric motor M (the armature of which is shown at 29 in Fig. 2) which drives in the normal way through a reduction gear which may comprise a worm 1 and worm wheel 1a. The final wheel 1a of the reduction gear is provided with an internally splined hub through which slides a splined shaft 2 which carries at one end a multi-toothed female clutch member 3. Axial movement of the shaft 2 causes the female clutch member 3 to engage with a corresponding multi-toothed male clutch member 4 mounted on the turbine shaft partly shown at 4a or on the pinion shaft of the main reduction gear normally coupled with the turbine.

Engagement and disengagement of the clutch is effected by means of a servomotor 5 of the double-acting piston type which may be operated by air or hydraulic fluid under pressure. The rod 5a of the servomotor is connected with the clutch by means of a pivoted lever 6 and a thrust collar 6a. Control of the admission of working fluid to either side of the servomotor piston is effected by means of an electrically-operated valve 8, which is preferably a master valve controlling the motor through the main valves 7. When the operating coil of the master valve 8 is energised, fluid is admitted to one side of the piston to move the clutch from the disengaged to the engaged position and when said coil of said master valve 8 is de-energised fluid is admitted to the other side of the piston to move the clutch from the engaged position to the disengaged position. As fully described with reference to Fig. 2 the master valve 8 is controlled by means of an electric limit switch 9 which is operated by means of a manually displaceable control member such as a hand-lever 10 mounted on the manoeuvring platform P to which the operating member of said limit switch is coupled by a system of rods 10a and bell-crank levers 10b. Said lever 10 is also connected by rods 10a and bell cranks 10b to a detector device 11 which prevents complete movement of the hand-lever 10 in its quadrant unless the turbine, indicated diagrammatically by the reference numeral 27, is not rotating. For a complete description of this detector device reference is directed to the said copending application U. S. Serial No. 358,257. The rods 10a and bell-crank levers 10b, in addition to coupling the detector device 11 and the limit switch 9 to the hand lever 10 also couple a locking device 12 for the servomotor 5 to said lever 10. The locking device consists of a bolt 12a mechanically coupled by rods 10a and bell cranks 10b to the hand lever 10, which bolt engages with a socket in said piston rod 5a when the hand lever is in the "disengaged" position (shown) and the clutch is in the illustrated disengaged position.

In order to facilitate proper engagement and disengagement of the clutch 3, 4 provision is made, as will be hereinafter described, for ensuring that such engagement and disengagement is made while there is no load on the electric turning motor M. Thus the turning motor M and the electric master valve 8 for the servo motor are incorporated in a circuit arrangement which ensures that, when the lever 10 is operated for initiating the turning of the turbine by its turning motor, the turning motor M becomes temporarily energized before the servo motor advances the clutch 3, 4 towards the engaged position; if the clutch fails to engage, the servo motor 5 withdraws the clutch temporarily, following which the motor is again energized temporarily and the clutch advanced once more towards the engaged position, this cycle being repeated until such time as the clutch engages.

The circuit arrangements for effecting this cycle are shown in Fig. 2. In the drawing, the relay or contactor coils are shown divorced from their contacts, which latter are represented by the reference numeral used for the relay or contactor operating coil together with an appropriate suffix. The circuit arrangements of Fig. 2 include the limit switch 9 which is closed when the hand lever 10 (Fig. 1) is moved from its "disengaged" position shown into the "engaged" position indicated by the dotted line D. Switch 9 when closed co-operates with a first limit switch 16 (Figs. 1 and 2) operatively connected to the clutch lever 6 (Fig. 1) so as to be normally closed only when the clutch is disengaged, to establish a circuit for the coil 17 of a first time delay relay having normally open contacts 17a and normally closed contacts 17b. This circuit further includes contacts 18a of a second time delay relay which are closed when the coil 18 of said relay is de-energized; in addition to contacts 18a this relay has normally open contacts 18b. Contacts 17a of the first time delay relay 17 are included in series with the coil 18 of the second relay. The first relay coil 17 is arranged to close its contacts 17a and open its contacts 17b immediately when energized but to open said contacts 17a and close said contacts 17b when de-energized, with a delay period which is adjustable and preferably of one-half to one second; the second relay 18 is arranged to open its contacts 18a and close its contacts 18b immediately when energized but to close contacts 18a and open contacts 18b when de-energized, after a delay period which is adjustable and longer than the delay period for the relay 17, being preferably of two seconds. The contacts 17b of the first relay and contacts 18b of the second relay are connected in series with the operating coil 23 of the master valve 8 (Fig. 1).

The turning motor M comprises the armature 29 and series and shunt field windings 32 and 33, the shunt field 33 preferably being shunted by a non-linear resistance 38. A two-position selector switch 24 having a moving contact and two fixed contacts is supplied with power at the moving contact by the closing of the first relay contacts 17a after closure of limit switch 9 and with limit switch 16 closed. In series with the fixed contacts are respectively the coils 25 and 26 of two contactors, one for determining forward or ahead operation of the turning motor and the other for determining its astern rotation. The "ahead" contactor coil 25 is energized over normally closed contacts 26a of the "astern" contactor 26 and when energized closes contacts 25b for establishing an energizing circuit for operating motor armature 29 in a direction corresponding to "ahead" rotation of the turbine shaft 4a. The "astern" contactor coil 26 is energized over a normally closed contact 25a of the "ahead" contactor and when energized closes contacts 26b to energize the motor armature 29 in the direction corresponding to "astern" rotation of the turbine shaft 4a.

A shunt field contactor coil 34 is connected in series with the coils 25 and 26. The contactor coil 34 when energized closes normally open contacts 34a to connect the shunt field 33 across the armature 29; it also closes normally open contacts 34b to energize an operating coil 36 for a starting rheostat 36a in the circuit of the turning motor armature 29.

Isolating switches 39 are provided for isolating the entire circuit from the electric supply lines.

A second limit switch 30, which is also operatively connected to the clutch lever 6 (Fig. 1) is arranged to be open when the clutch 3, 4 is in the disengaged position and to close only when the clutch becomes fully engaged. This limit switch 30, when closed, short-circuits the first limit switch 16 and the first relay contact 17a thus to maintain relay coil 18 energized for holding energized the coil 23 for the master valve 8 (Fig. 1); and through changeover switch 24 it maintains contactor coil 25 or 26 energized independently of switch 16 and first relay contacts 17a, thus to continue the power supply to the turning motor.

The sequence of operations will now be described with reference to Figs. 1 and 2.

Movement of the lever 10 from the "disengaged" position (shown) in the direction D towards the "engaged" position will cause closure of limit switch 9 to energize the first relay coil 17 through the first limit switch 16 and the second relay contacts 18a. The first relay immediately closes contacts 17a thus supplying power to the selector switch 24, accordingly, depending upon the position of the switch, to energize one or other of the "ahead" and "astern" contactor coils 25, 26, for establishing the appropriate operating circuit for the driving motor armature 29; contacts 17a also close the energizing circuit for the second relay coil 18. Immediately the second relay coil 18 is energized its contacts 18a open for de-energizing the first relay coil 17, which however does not drop until after a time delay of one-half to one second; coil 18 also closes its contacts 18b in series with the coil 23 of the master valve 8 but with the first relay contacts 17b being opened at this time the energizing circuit of the master valve coil 23 remains open. After the delay period for the first relay, its contacts 17b close thus to complete the aforesaid energizing circuit for the master valve coil 23 which in operating causes the servomotor 5 to move the clutch in the engaging direction. At the same time, the first relay contacts 17a open thus to interrupt the energizing circuit established as aforesaid over limit switch 16 and changeover switch 24 for the "ahead" or "astern" contactor coil 25 or 26, and shunt field contactor coil 34, accordingly to de-energize the motor; also the second relay coil 18 is de-energized for operating its contacts 18a, 18b after the time delay of two seconds.

It will be seen that up to this time the turning motor has been supplied with current for one-half to one second, giving it a short impulse and the clutch has been moved in the engaging direction for one to one-and-a-half seconds.

The displacement of the clutch causes the first limit switch 16 to open and thus to prevent further energisation of the first relay coil 17 and of the turning motor.

If the clutch fully engages, the second limit switch 30 closes and short circuits the limit switch 16 and the contacts 17a of the first relay, thus supplying power to the changeover switch 24 for the turning motor and the coil 18 of the second relay. In this way the contact 18b of the second relay is kept closed and the coil 23 of the master valve is kept energised to maintain the clutch in engagement until the limit switch 9 is opened by displacement of the control member 10 to the "disengaged" position.

If the clutch does not engage, the limit switch 30 is not closed and the second relay coil 18 not having its energizing circuit established at either of the limit switches 16 or 30 drops after its delay period of two seconds and its contacts 18b opens and de-energises the master valve coil 23 causing the clutch to return to its disengaged position. After the clutch is once more in the fully disengaged position, the limit switch 16 recloses so that another cycle of operations commences automatically.

With this arrangement, no torque is transmitted by the motor until the clutch is engaged and in the event of the clutch members meeting tooth-to-tooth, then after a short time delay the clutch will be withdrawn, the turning motor will be energised for a brief period and the system will re-attempt engagement of the clutch.

The action of moving the hand lever to the "disengaged" position opens the master-valve limit switch 9 whereby to de-energise all circuits and thus ensure that the turning motor and the master valve coil 23 are de-energised simultaneously with one another and prior to the operation of disengaging the clutch.

What I claim is:

1. Turning equipment for a steam turbine rotor including an electric turning motor, a toothed clutch adapted for movement from a disengaged position to an engaged position for interconnecting the motor with the turbine rotor, a servo-motor for moving the clutch between its disengaged and engaged positions and a manual control device operable between a position corresponding to the clutch being disengaged and a position corresponding to the clutch being engaged, in combination with control means for said turning motor and servo-motor, comprising electric switching means responsive to movement of the control device from the clutch-disengaged position to energise the electric turning motor, timing relay means conditioned by the control device with the clutch in disengaged position so as at the end of a predetermined time interval to de-energise the motor and to condition the servo motor for engaging the clutch, means responsive to failure of the clutch teeth to interengage and operable to condition the servo motor for moving the clutch towards its disengaged position, and means for automatically re-energising the motor and reconditioning the servo motor for moving the clutch from its disengaged position to the engaged position.

2. Turning equipment for a steam turbine rotor including an electric turning motor, a toothed clutch adapted for movement from a disengaged position to an engaged position for interconnecting the motor with the turbine rotor, a servo motor having an electric valve which, when energised, is effective to condition the servo motor for moving the clutch from its disengaged to its engaged position, but, when de-energised, to condition said servo motor for moving the clutch to its disengaged position, and a manual control device operable between a position corresponding to the clutch being disengaged and a position corresponding to the clutch being engaged, in combination with electric control means comprising a first relay means adapted when energised to close an energising circuit for a second relay means and to energise the turning motor but to interrupt said circuit for said second relay means and to de-energise the turning motor after a predetermined time delay, electric switch means responsive to movement of said control device from its clutch-disengaged position, while the clutch is disengaged, to energise said first relay means, said second relay means being adapted, when energised, to interrupt the energising circuit for the first relay means and to close a circuit, which is established by the first relay means at the end of its predetermined time delay after being de-energised, for energising the servo motor electric valve but to open said circuit at the end of a second predetermined time delay after being de-energised, the time delay for said second relay being longer than that for the first relay, and switch means responsive to movement of the clutch from its disengaged position to interrupt the energising circuit for said second relay means, whereby, when said control device is moved from its clutch-disengaged position, said first relay means is effective to energise the turning motor but at the end of its time delay to de-energise said motor, and to co-operate jointly with the second relay means in conditioning the servo-motor for moving the clutch from its disengaged position to the engaged position but after said second time delay to condition said servo-motor for moving the clutch towards its disengaged position.

3. Turning equipment according to claim 2, and having electric switch means responsive to engagement of the clutch to establish an energising circuit for the turning motor alternative to that established by said first relay means, whereby if the clutch is properly engaged within the time delay of the said second relay means, the turning motor is effective to rotate the turbine shaft through the clutch.

4. Turning equipment according to claim 2, and having electric switch means responsive to engagement of the clutch to establish an energising circuit from the said second relay means alternative to that established by the said first relay means, whereby if the clutch is properly engaged within the time delay of the said second relay means the electric valve for conditioning the servomotor to engage the clutch is maintained energised for holding the clutch engaged.

5. Turning equipment for a steam turbine rotor including an electric turning motor, a toothed clutch adapted for movement from a disengaged position to an engaged position for interconnecting the motor with the turbine rotor, a servo-motor for moving the clutch between its disengaged and engaged positions and a manual control device operable between a position corresponding to the clutch being disengaged and a position corresponding to the clutch being engaged, in combination with control means for said turning motor and servo-motor comprising electric switch means responsive to movement of the control device from the clutch-disengaged position to energise the turning motor under control of first time delay relay means operative to de-energise the motor a predetermined interval of time after such energisation and to condition the servo-motor for moving the clutch towards its engaged position, further time delay relay means responsive jointly to the said movement of the control device and to the clutch moving from its disengaged position but not attaining the properly engaged position to condition the servo-motor for moving the clutch towards its disengaged position within a second and time delay interval longer than the first, and means responsive to movement of the clutch into its disengaged position for re-energising the turning motor under control of the first time delay relay means.

6. Turning equipment for a steam turbine rotor including an electric turning motor, a clutch adapted for movement from a disengaged position to an engaged position for interconnecting the motor with the turbine rotor, a servo-motor for moving the clutch between its disengaged position and its engaged position, and a manual control device operable between a position corresponding to the clutch being disengaged and a position corresponding to the clutch being engaged, in combination with control means for the turning motor and servo-motor comprising electric switch means responsive to movement of the control device from its clutch-disengaged position, a first time delay relay means having its energising circuit established by the electric switch means with the clutch in its disengaged position, said first relay means, when energised, establishing a circuit for energising the turning motor, and also a circuit for a second time delay relay means but effective at the end of a predetermined time delay to interrupt said turning motor circuit and said energising circuit for the second time delay relay means, said first and said second time delay relay means jointly controlling a circuit for conditioning the servomotor to move the clutch from its disengaged position towards its engaged position, and said second time delay relay means being effective at the end of a predetermined time delay from interruption of its energising circuit which is longer than that for said first relay means to interrupt the said servo-motor conditioning circuit, and means for detecting when the clutch is in the engaged position to establish an alternative energising circuit for the turning motor.

References Cited in the file of this patent

UNITED STATES PATENTS 2,223,088    Berges  ---------------- Nov. 26, 1940